United States Patent
Kitaev et al.

(10) Patent No.: US 10,909,461 B1
(45) Date of Patent: Feb. 2, 2021

(54) ATTENTION NEURAL NETWORKS WITH LOCALITY-SENSITIVE HASHING

(71) Applicant: Google LLC, Mountain View, CA (US)

(72) Inventors: Nikita Kitaev, Berkeley, CA (US); Lukasz Mieczyslaw Kaiser, Mountain View, CA (US); Anselm Caelifer Levskaya, Oakland, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/870,815

(22) Filed: May 8, 2020

(51) Int. Cl.
*G06N 3/08* (2006.01)
*G06N 3/04* (2006.01)

(52) U.S. Cl.
CPC .......... *G06N 3/088* (2013.01); *G06N 3/0454* (2013.01)

(58) Field of Classification Search
None
See application file for complete search history.

(56) References Cited

PUBLICATIONS

Andoni et al, "Practical and optimal LSH for angular distance" arXiv, 2015, 21 pages.
Devlin et al, "BERT: Pre-training of Deep Bidirectional Transformers for Language Understanding" arXiv, 2019, 16 pages.
Gomez et al, "The reversible residual network: Backpropagation without storing activations" Advances in Neural Information Processing Systems, 2017, 11 pages.
Raffel et al, "Exploring the Limits of Transder Learning with a Unified Text-to-Text Transformer" arXiv, 2019, 53 pages.
Vaswani et al, "Attention Is All You Need" arXiv, 2017, 15 pages.

*Primary Examiner* — Li B. Zhen
(74) *Attorney, Agent, or Firm* — Fish & Richardson P.C.

(57) ABSTRACT

Methods, systems, and apparatus, including computer programs encoded on a computer storage medium, for performing a machine learning task on a network input to generate a network output. In one aspect, one of the systems includes an attention neural network configured to perform the machine learning task, the attention neural network including one or more LSH attention layers, each LSH attention layer comprising one or more LSH attention sub-layers, each LSH sub-layer configured to: receive a sequence of queries derived from an input sequence to the LSH attention layer, the sequence of queries having a respective query at each of a plurality of input positions; determine one or more respective hash values for each of the respective queries at each of the plurality of input positions; generate a plurality of LSH groupings; and generate an attended input sequence.

24 Claims, 5 Drawing Sheets

ATTENTION NEURAL NETWORKS WITH LOCALITY-SENSITIVE HASHING

BACKGROUND

This specification relates to performing a machine learning task on a network input using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a system implemented as computer programs on one or more computers in one or more locations that performs a machine learning task on a network input.

Particular embodiments of the subject matter described in this specification can be implemented so as to realize one or more of the following advantages.

The techniques described in this specification allow a neural network system to process input sequences, generate output sequences, or both more efficiently than existing attention-based networks both during training and at run-time, i.e., in terms of computational resources (e.g., memory, computing power, or both), by making use of a locality-sensitive hashing (LSH) attention mechanism and reversible residual connection layers.

The attention layers within some existing attention neural networks employ a dot-product attention mechanism which involves computing, for every given query, respective dot products of the query with all of the keys. The networks typically derive such keys or queries from network inputs that may be sequential. Thus the computational cost could be substantial when applying a dot-product attention mechanism over sequential data that is of significant length.

Training these existing attention neural networks can also be problematic, because the respective activations from each network layer, which oftentimes require tens or hundreds of gigabytes of memory collectively, need to be saved for use in computing the backpropagated gradients.

The described techniques, however, address these problems by (i) applying an LSH attention mechanism to effectively restrict the set of input positions that a respective query at each input position can attend to and (ii) connecting network layers with reversible residual connection which can recover intermediate layer activations from final layer activations during backpropagation, thus eliminating the need of storing all layer activations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
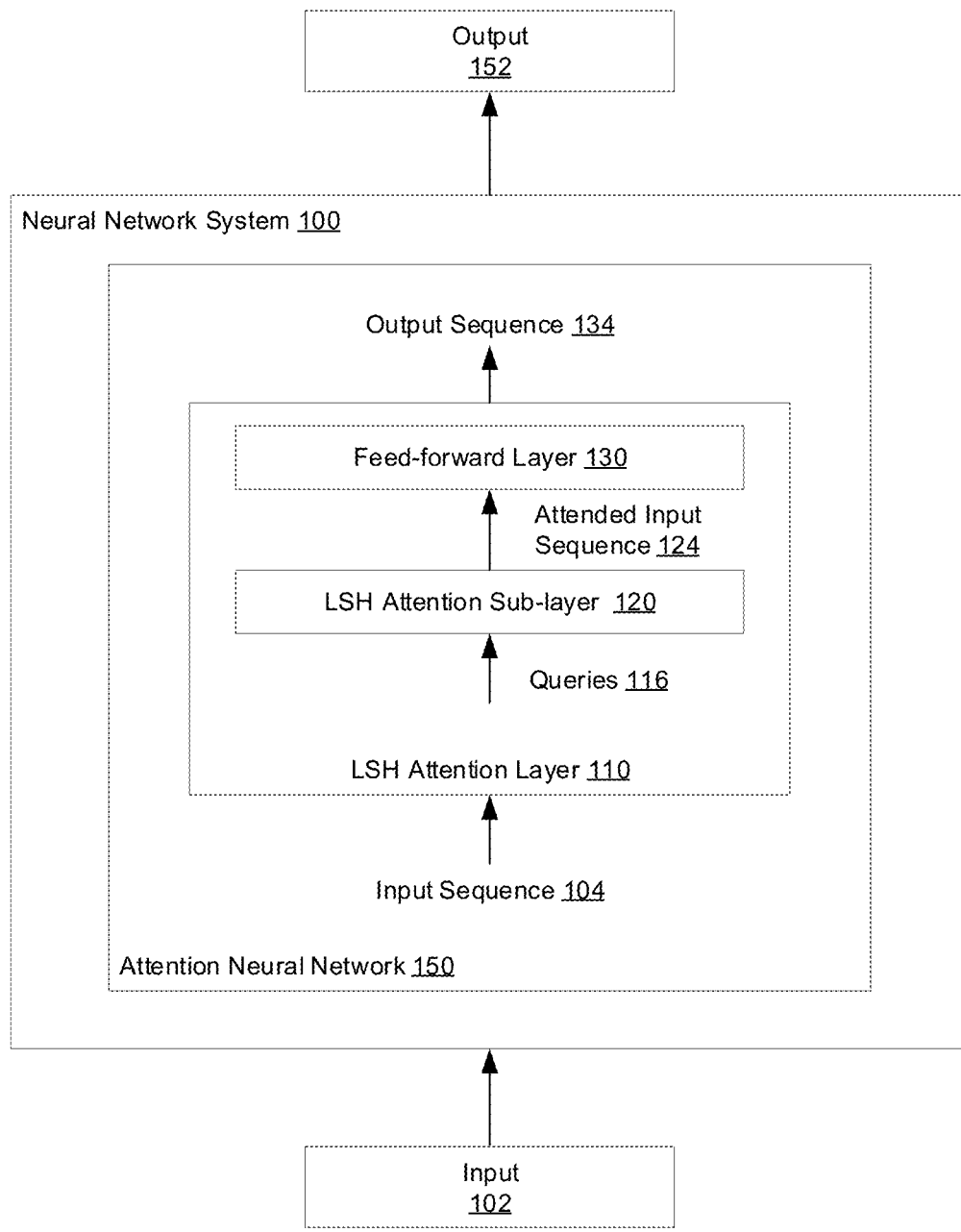
FIG. 1 shows an example neural network system.

This specification describes a system implemented as computer programs on one or more computers in one or more locations that performs a machine learning task on a network input.

The machine learning task can be any machine learning task that (i) operates on a network input that is an input sequence, (ii) generates a network output that is an output sequence, or (iii) both.

Some examples of machine learning tasks that the system can be configured to perform follow.

As one example, the machine learning task may be neural machine translation, where the input to the neural network is a sequence of text in one language and the output generated by the neural network may be a score for each of a set of pieces of text in another language, with each score representing an estimated likelihood that the piece of text in the other language is a proper translation of the input text into the other language.

As another example, the task may be an audio processing task. For example, if the input to the neural network is a sequence representing a spoken utterance, the output generated by the neural network may be a score for each of a set of pieces of text, each score representing an estimated likelihood that the piece of text is the correct transcript for the utterance. As another example, if the input to the neural network is a sequence representing a spoken utterance, the output generated by the neural network can indicate whether a particular word or phrase ("hotword") was spoken in the utterance. As another example, if the input to the neural network is a sequence representing a spoken utterance, the output generated by the neural network can identify the natural language in which the utterance was spoken.

As another example, the task can be a natural language processing or understanding task, e.g., an entailment task, a paraphrase task, a textual similarity task, a sentiment task, a sentence completion task, a grammaticality task, and so on, that operates on a sequence of text in some natural language.

As another example, the task can be a text to speech task, where the input is text in a natural language or features of text in a natural language and the network output is a spectrogram or other data defining audio of the text being spoken in the natural language.

As another example, the task can be a health prediction task, where the input is a sequence derived from electronic health record data for a patient and the output is a prediction that is relevant to the future health of the patient, e.g., a predicted treatment that should be prescribed to the patient, the likelihood that an adverse health event will occur to the patient, or a predicted diagnosis for the patient.

As another example, the task can be a text generation task, where the input is a sequence of text, and the output is another sequence of text, e.g., a completion of the input sequence of text, a response to a question posed in the input sequence, or a sequence of text that is about a topic specified by the first sequence of text. As another example, the input to the text generation task can be an input other than text, e.g., an image, and the output sequence can be text that describes the input.

As another example, the task can be an image generation task, where the input is a conditioning input and the output is a sequence of intensity values for the pixels of an image. As another example, the task can be an agent control task, where the input is a sequence of observations or other data characterizing states of an environment and the output defines an action to be performed by the agent in response to the most recent data in the sequence. The agent can be, e.g., a real-world or simulated robot, a control system for an industrial facility, or a control system that controls a different kind of agent.

To perform the machine learning task, the system includes an attention neural network that includes multiple layers. One or more of the multiple layers are locality-sensitive hashing (LSH) attention layers that operate on a respective input sequence that includes a respective input vector at each of one or more positions.

Moreover, each LSH attention layer includes an LSH attention sub-layer and a feed-forward layer. The attention sub-layer receives a sequence of queries derived from the input sequence for the LSH attention layer and generates an attended input sequence.

In particular, the attention sub-layer applies "LSH attention", e.g., in place of dot-product attention, to generate a plurality of LSH groupings by determining one or more respective hash values for each key and assigning the respective keys having similar hash values into a same LSH grouping. The attention sub-layer then applies an attention mechanism over respective keys within each LSH grouping to generate the attended input sequence. That is, in "LSH attention" and unlike in dot-product attention, to generate the attended input sequence, the attention mechanism is specifically applied over respective keys within each LSH grouping, i.e., instead of all keys in the sequence of keys derived from the input sequence for the LSH attention sub-layer.

The attention mechanism applied by the attention sub-layer depends on the configuration of the attention neural network, as will be described in more detail below. The feed-forward layer then operates on the attended input sequence to generate an output sequence for the layer.

Generally, the layers within the attention neural network can be arranged in any of a variety of configurations.

As one example, when the network input is an input sequence, the attention neural network can include an encoder neural network that includes a subset of the plurality of layers and that encodes the input sequence to generate a respective encoded representation of each input in the sequence. In this example, the attention mechanism applied by the layers in the encoder is a self-attention mechanism, e.g., a multi-head self-attention mechanism. In a self-attention mechanism, the input vectors and the memory vectors operated on by the attention mechanism are the same, i.e., the vectors in the input sequence for the layer.

As another example, the attention neural network includes a decoder neural network that includes a different subset of the plurality of layers and that processes either the network input or the encoded representation of the network input to generate the network output.

In some of these examples, when the network output is an output sequence, the decoder neural network operates auto-regressively to generate the outputs in the output sequence and the attention sub-layers within some or all of the layers of the decoder apply masked self-attention over the partially generated output sequence. That is, the decoder neural network generates the output sequence, by at each of a plurality of generation time steps, generating a network output for a corresponding output position conditioned on (i) the encoded representation or the network input and (ii) network outputs at output positions preceding the output position in the output order. In masked self-attention, the input vectors and the memory vectors operated on by the attention mechanism are the same, but the attention mechanism is masked so that any given position in the input sequence does not attend over any positions after the given position in the input sequence.

In some of these examples, the attention neural network can make use of both LSH attention mechanism and other attention mechanisms, e.g., dot-product attention mechanism, to generate different attended input sequences. That is, when the attention neural network includes multiple attention sub-layers, some of the attention sub-layers can apply LSH attention while others can apply dot-product attention.

When the attention neural network includes a decoder neural network that operates directly on the input sequence, i.e., includes only a decoder and not an encoder, the attention layers within the decoder can apply a self-attention mechanism over the input sequence.

Examples of configurations of attention neural networks and the specifics of the other components of attention neural networks, e.g., embedding layers that embed inputs to the encoder and the decoder, the feed-forward layers within the layers of the attention network, and the output layers of the attention neural network that generate the network outputs, are described in more detail in Vaswani, et al, *Attention Is All You Need*, arXiv:1706.03762, Raffel, et al, *Exploring the Limits of Transfer Learning with a Unified Text-to-Text Transformer*, arXiv:1910.10683, and Devlin et al, *BERT: Pre-training of Deep Bidirectional Transformers for Language Understanding*, arXiv:1810.04805, the entire contents of which are hereby incorporated by reference herein in their entirety.

FIG. 1 shows an example neural network system 100. The neural network system 100 is an example of a system implemented as computer programs on one or more computers in one or more locations, in which the systems, components, and techniques described below can be implemented.

The neural network system 100 can receive an input 102 and perform a machine learning task on the input 102 to generate an output 152.

As described above, the neural network system 100 can perform any of a variety of tasks that involves (i) operating on an input 102 that is an input sequence, (ii) generating an output 152 that is an output sequence, or (iii) both.

The neural network system 100 includes an attention neural network 150 that includes a locality-sensitive hashing (LSH) attention layer 110. The LSH attention layer 110 operates on an input sequence 104 and generate a corresponding output sequence 134.

Although one LSH attention layer is depicted in FIG. 1 for convenience, as described above, the attention neural network 150 may include many other layers, including, for example, embedding layers, output layer, and more LSH attention layers.

Specifically, the input sequence 104 has a respective input at each of multiple input positions in an input order and the output sequence 134 has a respective output at each of multiple output positions in an output order. That is, the input sequence 102 has multiple inputs arranged according to an input order and the output sequence 134 has multiple outputs arranged according to an output order.

In general, the input sequence 104 can be any intermediate sequential data generated by the attention neural network 150 when performing the machine learning task on the input 102. For example, the input sequence 104 can be embedded (i.e., numeric) representations of the system input 102 generated by an embedding layer. As another example, the input sequence 104 can be an output sequence generated by a preceding LSH attention layer or other layer in the attention neural network 150.

In some implementations, to generate the output sequence 134 from the input sequence 104, the LSH attention layer 110 is configured to: apply a learned query linear transformation to each input at each input position to generate a respective query Q for each input position, apply a learned key linear transformation to each input at each input position to generate a respective key K for each input position, and apply a learned value linear transformation to each input at each input position to generate a respective value V for each input position. In general, the queries Q, keys K, and values V are all vectors. As used in this specification, the term "learned" means that an operation or a value has been adjusted during the training of the attention neural network 150. The linear transformations applied by the LSH attention layer 110 to generate the query and the key for each input position may or may not be different, and, when different, the neural network system 100 likely can generate higher quality attended input sequences which in turn improve task performance, but at the cost of requiring additional computational resources. Thus, to save the additional computational resources and their associated costs, the LSH attention layer 110 can instead apply a same query linear transformation to each input position to generate both query and key (that is equal to the query) for the input position. Because doing so typically has limited or no impact on the task performance, for convenience, this document assumes queries and keys to be the same and largely describes the techniques as being applied to queries. However, it should be noted that the techniques can be similarly applied to keys, i.e., in addition to being applied to queries when generating attended input sequences using the LSH attention mechanism.

The LSH attention layer 110 in turn includes one or more LSH attention sub-layers, e.g., LSH attention sub-layer 120, and one or more position-wise feed-forward layers, e.g., feed-forward layer 130.

The LSH attention sub-layer 120 is configured to receive the sequence of queries 116 and then apply the LSH attention mechanism using the queries, keys, and values to determine an attended input sequence 124 for the input sequence 104. The attended input sequence 124 generally includes a respective attended vector for each input at each input position. The LSH attention mechanism applied by the LSH attention sub-layer 120 is described in more detail below with reference to FIGS. 2-3.

In some implementations, to allow the LSH attention sub-layer 120 to jointly attend to information from different representation subspaces at different positions, the LSH attention sub-layer employs multi-head LSH attention.

To implement multi-ahead LSH attention, the LSH attention sub-layer applies h different attention mechanisms in parallel. In other words, the LSH attention sub-layer includes h different LSH attention layers, with each LSH attention layer within the same LSH attention sub-layer receiving the same original queries Q, original keys K, and original values V.

Each LSH attention layer is configured to transform the original queries, and keys, and values using learned linear transformations and then apply the LSH attention mechanism to the transformed queries, keys, and values. Each LSH attention layer will generally learn different transformations from each other attention layer in the same LSH attention sub-layer.

In particular, each LSH attention layer is configured to apply a learned query linear transformation to each original query to generate a layer-specific query for each original query, apply a learned key linear transformation (that is sometimes the same as the learned query linear transformation) to each original key to generate a layer-specific key for each original key, and apply a learned value linear transformation to each original value to generate a layer-specific values for each original value. The LSH attention layer then applies the LSH attention mechanism using these layer-specific queries, keys, and values to generate initial outputs for the attention layer.

The LSH attention sub-layer 120 then combines the initial outputs of the LSH attention layers to generate the final output of the LSH attention sub-layer. Specifically, the LSH attention sub-layer can compute a concatenation of the outputs of the LSH attention layers and apply a learned linear transformation to the concatenated output to generate as output an attended input sequence 124. In some cases, the learned transformations applied by the LSH attention sub-layer 120 reduce the dimensionality of the original keys and values and, optionally, the queries. For example, when the dimensionality of the original keys, values, and queries is d and there are h LSH attention layers in the sub-layer, the sub-layer may reduce the dimensionality of the original keys, values, and queries to d/h. This keeps the computation cost of the multi-head LSH attention mechanism similar to what the cost would have been to perform the LSH attention mechanism once with full dimensionality while at the same time increasing the representative capacity of the LSH attention sub-layer.

Each position-wise feed-forward layer 130 is configured to operate on each position in the attended input sequence 124 separately. In particular, for each input position, the feed-forward layer 130 is configured receive an attended layer input at the input position and apply a sequence of transformations to the attended layer input at the input position to generate an output for the input position. For example, the sequence of transformations can include two or more learned linear transformations each separated by an activation function, e.g., a non-linear elementwise activation function, e.g., a ReLU activation function, which can allow for faster and more effective training on large and complex datasets. The transformations applied by the layer 130 will generally be the same for each input position (but different feed-forward layers in the attention neural network 100 will apply different transformations).

Figure 4:
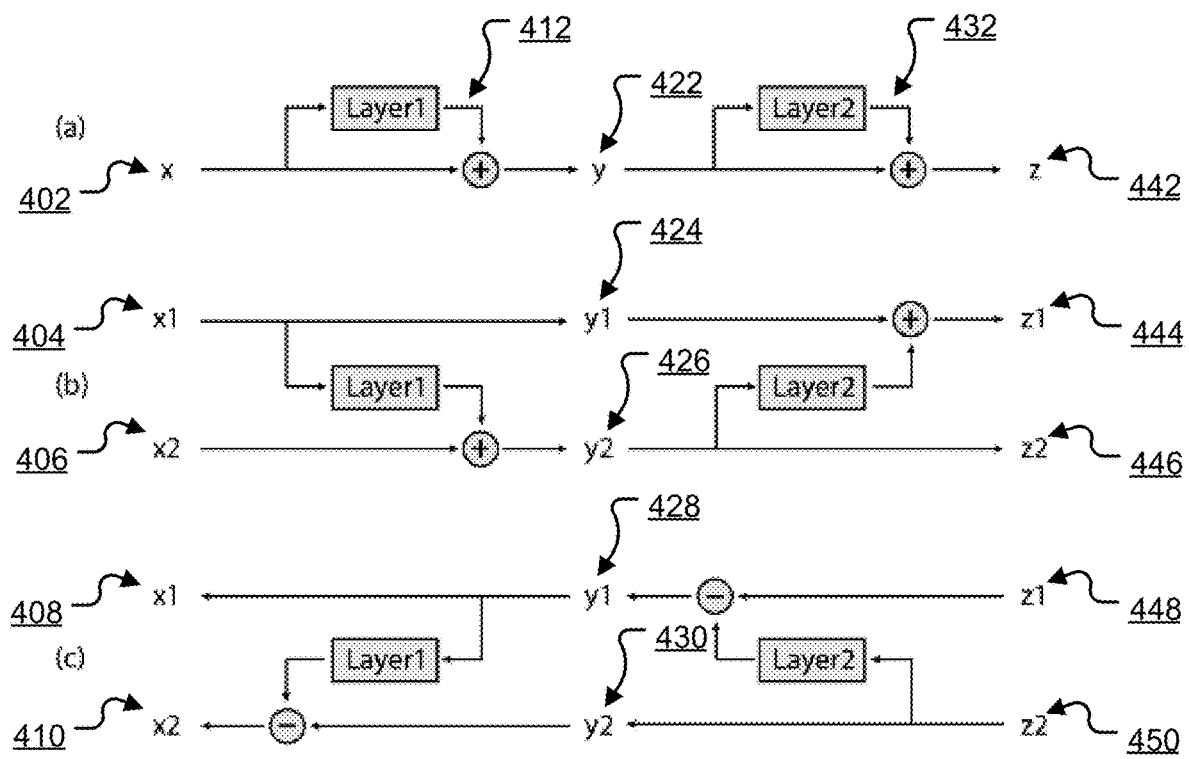
FIG. 4 is an illustration of a reversible residual connection in an attention neural network.

In some implementations, the attention neural network 150 also includes one or more reversible residual connection layers, e.g., in place of standard residual connection layers, that each connects a LSH attention sub-layer with a corresponding position-wise feed-forward layer. FIG. 4 is an illustration of a reversible residual connection in an attention neural network.

A common issue with training deep neural networks such as the attention neural network 150 using gradient descent techniques is that activations from each layer, which oftentimes require tens or hundreds of gigabytes of memory collectively, need to be saved for use in computing the backpropagated gradients. Activations generally refer to values of hidden layer outputs after applying an activation function.

FIG. 4(a) depicts example operations performed by a standard (i.e., non-reversible) residual connection layer when applied to a LSH attention sub-layer ("Layer 1") and a position-wise feed-forward layer ("Layer 2"). In a forward direction, i.e., either during training or at run-time, a first standard residual connection layer combines the output 412 of an attention sub-layer with the input 402 to the attention sub-layer to generate an attention residual output 422. A second residual connection layer combines the output 432 of the position-wise feed-forward layer with the input 422 to the position-wise feed-forward layer to generate a feed-forward residual output 442. In particular, during training, both outputs 422 and 442 need to be saved in order to compute the backpropagated gradients in a backward direction.

In contrast, and as will be described in more detail in the description below, by recomputing layer activations on-demand during backpropagation, e.g., instead of storing them in a memory device accessible to the neural network system 100, the reversible residual connection layer in turn allows the neural network system 100 to perform backpropagation training in a more memory-efficient manner.

The reversible residual connection layer first partitions a layer input into a pair of input partitions and then operates on the pair of input partitions to generate a pair of outputs. The reversible residual connection layer can perform the partition, for example, by applying binary maskings to the layer input. For example, the masking can be a checkerboard pattern masking that has value 1 where the sum of spatial input coordinates is odd, and 0 otherwise. As another example, the masking can be a channel-wise masking that has value 1 for the first half of the input channel dimensions and 0 for the second half.

In some implementations, the reversible residual connection layer in turn includes a layer normalization sub-layer that applies layer normalization to the residual outputs.

FIG. 4(b) depicts example operations performed by a reversible residual connection layer when applied to a LSH attention sub-layer ("Layer 1") and a position-wise feed-forward layer ("Layer 2") in the forward direction, i.e., either during training or at run-time. For the LSH attention sub-layer, the reversible residual connection layer uses a first forward input partition 404 as a first forward attention residual output 424. The reversible residual connection layer determines a second forward attention residual output 426 by combining (i) an output of the LSH attention sub-layer generated based on processing a first input partition 404 to the LSH attention sub-layer with (ii) a second forward input partition 406 to the LSH attention sub-layer.

The layer normalization sub-layer, when included, then applies layer normalization to the first and second forward attention residual outputs 424 and 426. Thus, for the position-wise feed-forward layer, the inputs received by the position-wise feed-forward layer can be the normalized outputs of the layer normalization layer when the layer normalization sub-layer is included or the residual outputs of the reversible residual connection layer when the layer normalization sub-layer is not included.

Specifically, for the position-wise feed-forward layer, the reversible residual connection layer determines a first forward feed-forward residual output 444 by combining (i) a first forward input partition 424 to the feed-forward layer with (ii) an output of the feed-forward layer generated based on processing a second forward input partition 426 to the feed-forward layer. The reversible residual connection layer uses the second forward input partition 426 as a second forward feed-forward residual output 446. As similarly described above, the layer normalization sub-layer, when included, then applies layer normalization to the first and second forward feed-forward residual outputs 444 and 446.

FIG. 4(c) depicts example operations performed by a reversible residual connection layer when applied to a LSH attention sub-layer ("Layer 1") and a position-wise feed-forward layer ("Layer 2") in the backward direction, i.e., during training. For the LSH attention sub-layer, the reversible residual connection layer uses a first backward input partition 428 (i.e., a first partition of a backpropagated gradient to the LSH attention sub-layer) as a first backward attention residual output 408. The reversible residual connection layer determines a second backward attention residual output 410 by subtracting (i) an output of the LSH attention sub-layer generated based on processing the first backward input partition 428 to the LSH attention sub-layer from (ii) a second backward input partition 430 to the LSH attention sub-layer. For the position-wise feed-forward layer, the reversible residual connection layer determines a first backward feed-forward residual output 428 by subtracting (i) an output of the feed-forward layer generated based on processing a second backward input partition 450 to the feed-forward layer from (ii) a first backward input partition 448 to the feed-forward layer. The reversible residual connection layer uses the second backward input partition 450 as a second backward feed-forward residual output 430. In this way, instead of storing all layer activations, the attention neural network 150 can only store the final layer activations, e.g., outputs 448 and 450, and efficiently recover intermediate layer activations, e.g., outputs 428 and 430, from the final layer activations.

Figure 2:
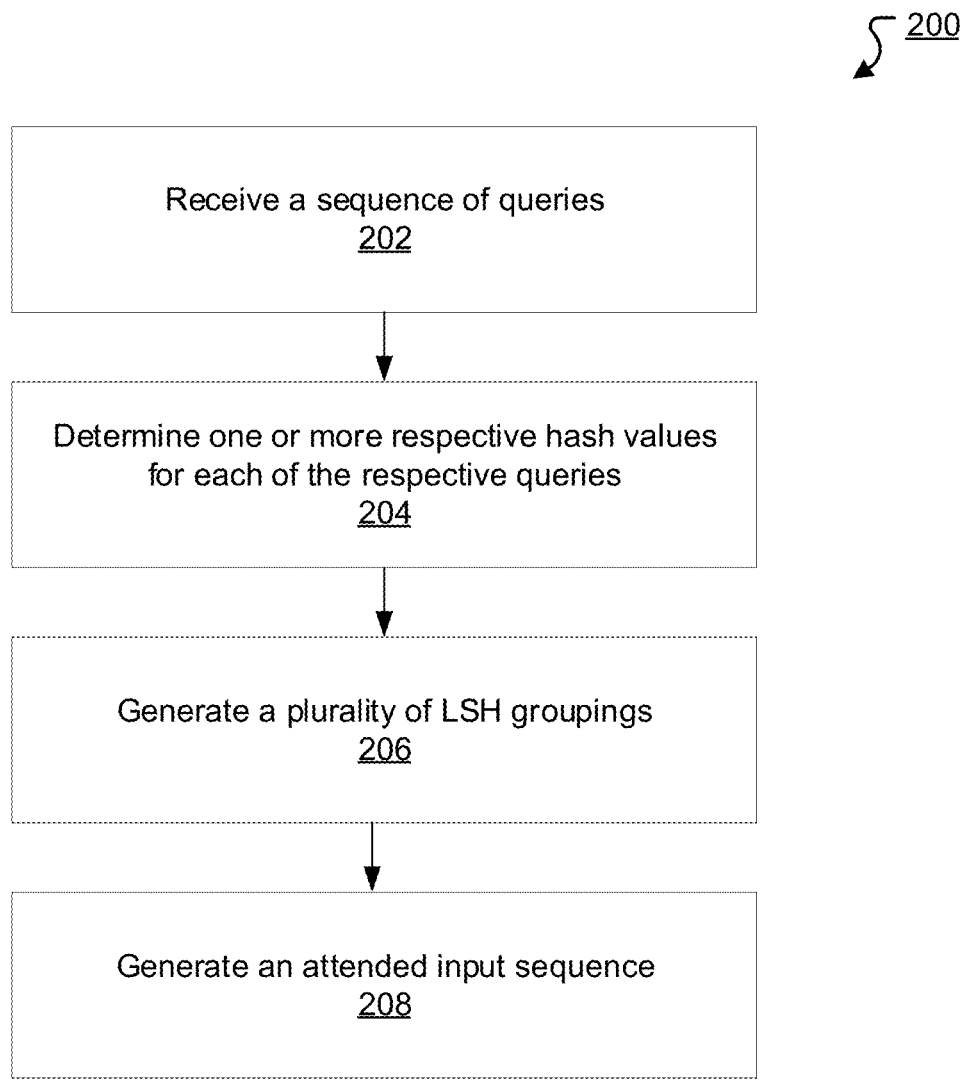
FIG. 2 is a flow diagram of an example process for generating an attended input sequence.

FIG. 2 is a flow diagram of an example process 200 for generating an attended input sequence. For convenience, the process 200 will be described as being performed by a system of one or more computers located in one or more locations. For example, a neural network system, e.g., neural network system 100 of FIG. 1, appropriately programmed in accordance with this specification, can perform the process 200.

The system receives, at a LSH attention sub-layer included in a LSH attention layer, a sequence of queries (202) that are derived from an input sequence to the LSH attention layer. As described above, the LSH attention layer or another system component can derive the sequence of queries by applying a learned query linear transformation to each input at each input position in the input sequence to generate a respective query for each input position. Each query is typically a vector.

The system determines one or more respective hash values for each of the respective queries (204) at each of the plurality of input positions. Specifically, the system can do so by using locality-sensitive hashing to map each query vector to a hash vector. Locality-sensitive hashing (LSH) is a technique that can map nearby query vectors (e.g., in terms of Hamming, Euclidean, or cosine distance) to the same hash vectors with higher probability than distant ones, thereby hashing similar input vectors into the same LSH groupings ("hash buckets") with high probability. The number of LSH groupings is smaller, and usually much smaller, than the number of input vectors. Various methods, for example, random projection, stable distributions, and bit sampling for Hamming distance can be used to determine appropriate LSH hash functions.

Figure 3A:
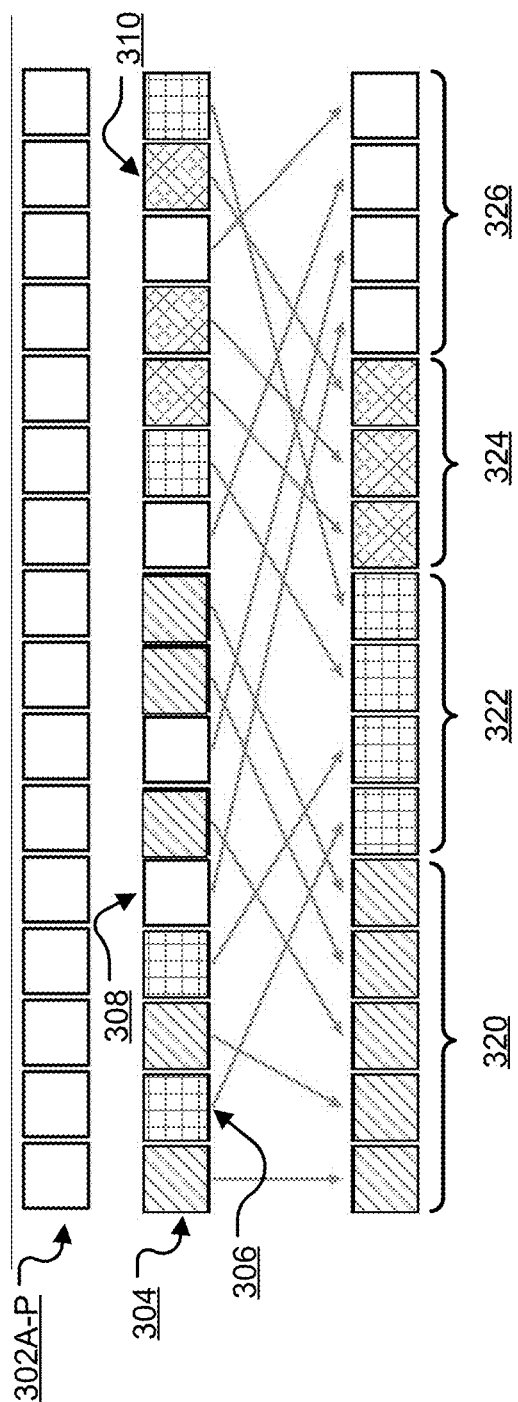
FIG. 3A-3B are illustrations of LSH attention mechanism that is applied by a LSH attention sub-layer in an attention neural network.

FIG. 3A is an illustration of LSH attention mechanism that is applied by a LSH attention sub-layer in an attention neural network. In the example of FIG. 3A, the system receives a sequence of queries 302A-P at the LSH attention sub-layer and determines a respective hash value for each query at a particular input position based on a given LSH hash function which can map different input vectors into a total of four hash vectors 304-310. By using the given LSH hash function, for example, the system maps query vector 302A to hash vector 304, query vector 302B to hash vector 306, query vector 302E to hash vector 308, and query vector 302O to hash vector 310.

In some implementations, the system can determine multiple hash values for each query at a particular input position by employing a multi-round LSH scheme, i.e., by repeatedly generating different hash values for the query using, for example, n distinct LSH hash functions $\{h^{(1)}, h^{(2)}, \ldots h^{(n)}\}$. Multi-round LSH can effectively reduce the possibility that nearby input vectors nevertheless fall in different LSH groupings. In some cases, the system can perform multiple rounds of hashing in parallel.

The system generates a plurality of LSH groupings (206). Briefly, this involves (i) assigning respective queries having similar, or, in some cases, the same hash values into a same LSH grouping and (ii) for each LSH grouping in the plurality of LSH groupings, sorting the respective queries in accordance with corresponding input positions for the queries in the LSH grouping.

In particular, for each input position i, the system can determine a set of input positions $P_i = \{j : h(q_i) = h(q_j)\}$ for which respective query vectors are hashed to a same hash value as the query vector at the input position i. In this way, the system determines different sets of input positions where each set, in turn, includes respective input positions of query vectors that all have a same hash value. The system then generates a plurality of LSH groupings by assigning query vectors whose input positions are within a same set (i.e., query vectors that all have a same hash value) into a same LSH grouping. Additionally, for each LSH grouping, the system sorts the respective queries such that query vectors located at the beginning of the input sequence are also located at the beginning of the LSH grouping.

Accordingly, as shown in example of FIG. 3A, the system assigns the sequence of queries into four LSH groupings 320-326.

In cases where multi-round LSH scheme is employed, the system correspondingly determines different sets of input positions $P_i^{(r)}$ for each input position i. That is, for each query at a particular input position, the system assigns the query into different LSH groupings based on the respective hash values. To generate the plurality of LSH groupings, the system then combines, e.g., by computing a union of, different sets of input positions $P_i^{(r)}$ for each input position i to determine which input positions that the query at the input position i should attend to. For example, after performing multiple rounds of hashing with n distinct hash functions $\{h^{(1)}, h^{(2)}, \ldots h^{(n)}\}$, the system computes, for each input position i:

$$P_i = \bigcup_{r=1}^{n_{rounds}} P_i^{(r)},$$

where at round r of the multi-round LSH scheme, $P_i^{(r)} = \{j : h^{(r)}(q_i) = h^{(r)}(q_j)\}$ represents the set of input positions for which respective query vectors are hashed to a same hash value as the query vector at the input position i by using hash function $h^{(r)}$.

As a simplified example, during a double round LSH, the first input position in the sequence (input position 1) is assigned to set $P_1^{(1)} = \{1,2,3\}$ at round 1, and to $P_1^{(2)} = \{1,2,4\}$ at round 2. For the first input position, the system can then determine a set of $P_1 = \{1,2,3,4\}$ by computing $P_1^{(1)} \cup P_1^{(2)}$.

In some implementations, the system further generates a sequence of LSH segments that are each of a same size from the plurality of LSH groupings. Such equally sized LSH segments allow for parallel processing devices, e.g. graphics processing units (GPUs) or tensor processing units (TPUs), to execute multiple computations in parallel at optimum efficiency. The system can generate the LSH segments by truncating any LSH groupings that are beyond a threshold size (e.g., having more than a threshold number of queries) and rearranging any excessive queries into an adjacent LSH segment in the sequence. The exact size of each LSH segment can be either predetermined or adjustable, e.g., by the system and based on the length of the input sequence.

Figure 3B:
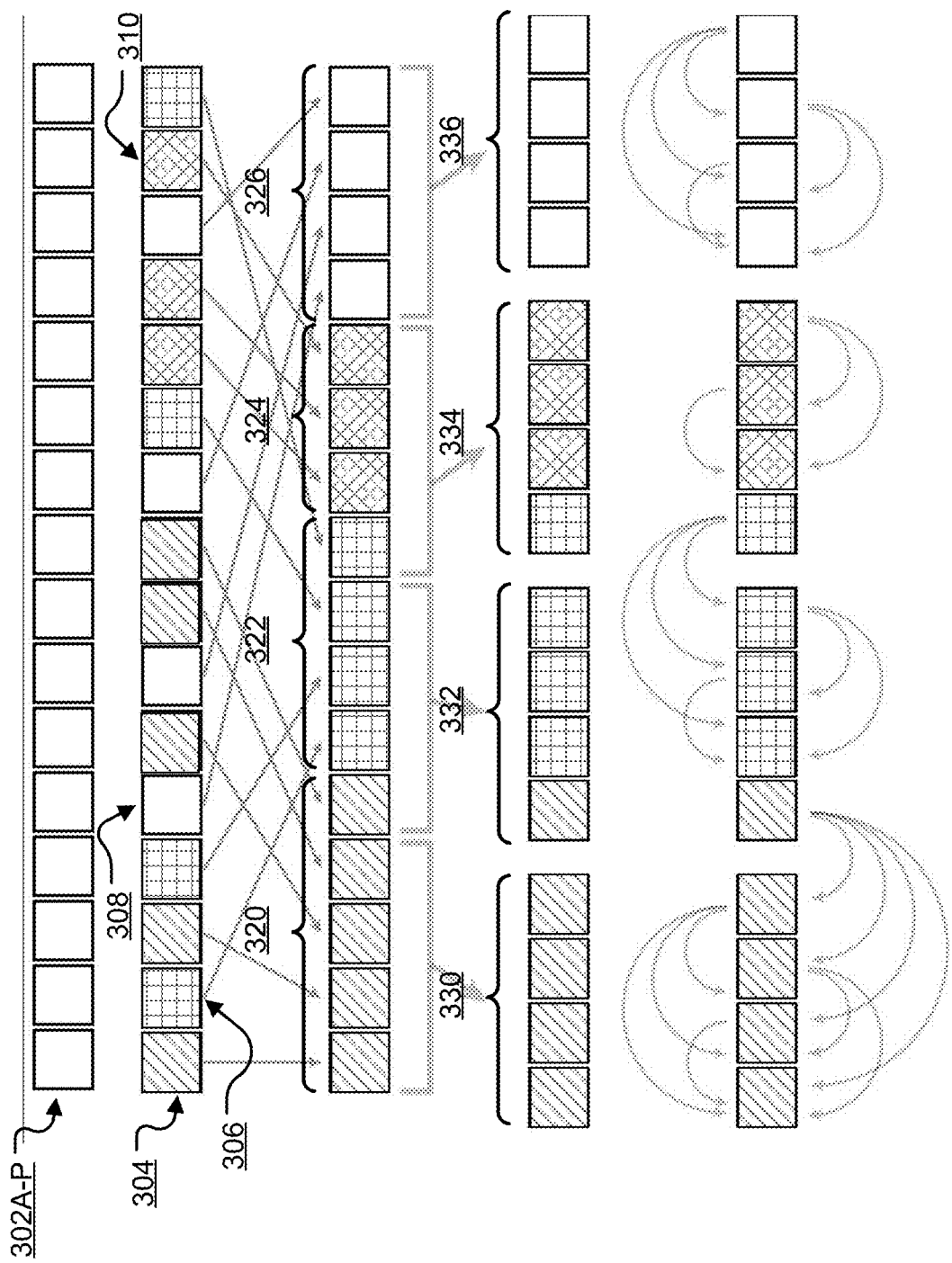

FIG. 3B is an illustration of LSH attention mechanism that is applied by a LSH attention sub-layer in an attention neural network. In the example of FIG. 3B, the system generates a sequence of LSH segments 330-336 from the sequence of LSH groupings 320-326. In particular, while the respective sizes of LSH groupings may vary, the LSH segments each have a same, fixed size.

The system generates an attended input sequence (208) based on applying an attention mechanism over respective queries within each one the plurality of LSH groupings. In this way, the system only allows attention within each single LSH grouping, thereby restricting the set of input positions that a respective query at each input position can attend to.

The attended input sequence includes a respective attended layer input at each of the plurality of input positions. Generally, an attention mechanism maps a query and a set of values to an output that is computed as a weighted sum of the values, where the query and values are both vectors. For example, in dot-product attention mechanism, for a given query, the system computes dot products of the query with all other queries that precede the given query in the same LSH grouping, divides each of the dot products by a scaling factor, e.g., by the square root of the dimensions of the queries, and then applies a softmax function over the scaled dot products to obtain the weights on the values. The system then computes a weighted sum of the values in accordance with these weights.

In implementations where the system also generates the sequence of equally sized LSH segments, the system can instead generate the attended input sequence by applying the attention mechanism over (i) respective queries within each LSH segment in the sequence and (ii) respective queries within one or more LSH segments that precede the LSH segment in the sequence. That is, in addition to allowing attention between queries within a single LSH segment, the system further allows a query to attend to any queries in one or more preceding LSH segments that used to belong to a same LSH grouping as the query before truncation. By doing so the system can mitigate potential risks of attentive information loss due to truncation.

For example, as shown in FIG. 3B, for each LSH segment in the sequence of LSH segments, the system applies attention mechanism over (i) respective queries within the LSH segment and (ii) respective queries within an immediately preceding LSH segment. Each curved arrow directing from a subsequent query to a preceding query in FIG. 3B indicates that some measures of attention, e.g., in terms of weights on values, are being paid by the system to the layer input at the corresponding preceding input position when processing the layer input at the corresponding subsequent input position when performing the machine learning task.

For each LSH attention layer in the attention neural network, the system can repeatedly (i.e., at each of one or more LSH attention sub-layers included in the LSH attention layer) perform the process 200 to process a sequence of queries that is derived from an input sequence to the LSH attention layer and to generate one or more attended input sequences from which the output sequence can then be determined.

That is, the process 200 can be performed as part of predicting an output sequence for an input sequence for which the desired output, i.e., the output sequence that should be generated by the system for the input sequence, is not known.

The process 200 can also be performed as part of processing input sequences derived from a set of training data, i.e., input sequences derived from a set of inputs for which the output that should be generated by the system is known, in order to train the attention neural network to determine trained values for the parameters of the attention neural network. The system can repeatedly perform the process 200 on inputs selected from a set of training data as part of a conventional machine learning training technique to train the initial neural network layers, e.g., a gradient descent with backpropagation training technique that uses a conventional optimizer, e.g., stochastic gradient descent, RMSprop, or Adam optimizer. During training, the system can incorporate any number of techniques to improve the speed, the effectiveness, or both of the training process. For example, the system can use dropout, label smoothing, or both to reduce overfitting. As another example, the system can perform the training using a distributed architecture that trains multiple instances of the attention neural network in parallel.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for performing a machine learning task on a network input to generate a network output, the system comprising one or more computers and one or more storage devices storing instructions that, when executed by the one or more computers, cause the one or more computers to implement:

an attention neural network configured to perform the machine learning task, the attention neural network comprising one or more locality-sensitive hashing (LSH) attention layers, each LSH attention layer comprising one or more LSH attention sub-layers, each LSH sub-layer configured to:
receive a sequence of queries derived from an input sequence to the LSH attention layer, the sequence of queries having a respective query at each of a plurality of input positions;

determine one or more respective hash values for each of the respective queries at each of the plurality of input positions;

generate a plurality of LSH groupings, including (i) assigning respective queries having similar hash values into a same LSH grouping and (ii) for each LSH grouping in the plurality of LSH groupings, sorting the respective queries in accordance with corresponding input positions for the queries in the LSH grouping; and generate an attended input sequence that comprises a respective attended layer input at each of the plurality of input positions, including, for each LSH grouping in the plurality of LSH groupings, applying an attention mechanism over respective queries within the LSH grouping.

2. The system of claim 1, wherein:

the LSH sub-layer is further configured to generate, from the plurality of LSH groupings, a sequence of LSH segments that are each of a same size; and the attention sub-layer is further configured to generate the attended input sequence that comprises a respective attended layer input at each of the plurality of input positions, including, for each LSH segment in the sequence of LSH segments, applying the attention mechanism over (i) respective queries within the LSH segment and (ii) respective queries within one or more preceding LSH segments.

3. The system of claim 1, wherein determining one or more respective hash values for each of the respective queries comprises repeatedly generating different hash values for the query using random projection techniques with different hash functions.

4. The system of claim 3, wherein repeatedly generating different hash values comprises generating the different hash values in parallel.

5. The system of claim 4, wherein assigning respective queries having similar hash values into the same LSH grouping comprises:

for each of the respective queries:
for each of the different hash values, assigning the query into a respective LSH grouping.

6. The system of claim 5, wherein assigning respective queries having similar hash values into the same LSH grouping further comprises:

for each of the respective queries:
computing a union of the respective LSH groupings to which the query has been assigned.

7. The system of claim 1, wherein each of the one or more LSH attention layers applies, for each LSH sub-layer, a respective query linear transformation to the input sequence to generate the sequence of queries for the LSH sub-layer.

8. The system of claim 1, wherein each of the one or more LSH attention layers applies, for each LSH sub-layer, a respective key linear transformation to the input sequence to generate a sequence of keys for the LSH sub-layer.

9. The system of claim 1, wherein the each LSH attention layer further comprises:

one or more position-wise feed-forward layers that are configured to generate an output sequence for the layer from the attended input sequence, the output sequence comprising a respective layer output at each of the plurality of input positions, and the generating comprising, for each of the plurality of input positions:

receive an attended layer input at the input position, and apply a sequence of transformations to the attended layer input at the input position to generate a layer output for the input position.

10. The system of claim 9, wherein the attention neural network further comprises:

one or more reversible residual connection layers that each connects a LSH attention sub-layer with a corresponding position-wise feed-forward layer by:

determining a first forward residual output by combining (i) a first partition of an input to the LSH attention sub-layer with (ii) an output of the LSH attention sub-layer generated based on processing a second partition of the input to the LSH attention sub-layer;

determining a second forward residual output by combining (i) the second partition of the input to the LSH attention sub-layer with (ii) an output of the LSH attention sub-layer generated based on processing the first forward residual output; and providing the first and second forward residual outputs as input to the corresponding position-wise feed-forward layer.

11. The system of claim 10, wherein the reversible residual connection layer further comprises a layer normalization sub-layer that applies layer normalization to the forward residual outputs.

12. The system of claim 1, wherein the attention neural network comprises:

an encoder neural network configured to receive an input sequence and generate a respective encoded representation of each of the network inputs in the input sequence; and a decoder neural network configured to receive the encoded representations and generate an output sequence.

13. The system of claim 12, wherein the decoder neural network auto-regressively generates the output sequence by, at each of a plurality of time steps, generating a network output at a corresponding output position conditioned on the encoded representations and network outputs at output positions preceding the output position in an output order.

14. The system of claim 12, wherein the encoder neural network comprises one or more LSH attention sub-layers.

15. The system of claim 12, wherein the decoder neural network comprises one or more LSH attention sub-layers.

16. The system of claim 1, wherein the attention neural network comprises a decoder neural network configured to receive the network input and generate the network output, the decoder neural network comprising one or more LSH attention sub-layers.

17. One or more non-transitory computer storage media storing instructions that when executed by one or more computers cause the one or more computers to implement:

an attention neural network configured to perform the machine learning task, the attention neural network comprising one or more locality-sensitive hashing (LSH) attention layers, each LSH attention layer comprising one or more LSH attention sub-layers, each LSH sub-layer configured to:

receive a sequence of queries derived from an input sequence to the LSH attention layer, the sequence of queries having a respective query at each of a plurality of input positions;

determine one or more respective hash values for each of the respective queries at each of the plurality of input positions;

generate a plurality of LSH groupings, including (i) assigning respective queries having similar hash values into a same LSH grouping and (ii) for each LSH grouping in the plurality of LSH groupings, sorting the respective queries in accordance with corresponding input positions for the queries in the LSH grouping; and generate an attended input sequence that comprises a respective attended layer input at each of the plurality of input positions, including, for each LSH grouping in the plurality of LSH groupings, applying an attention mechanism over respective queries within the LSH grouping.

18. The computer storage media of claim 17, wherein:
the LSH sub-layer is further configured to generate, from the plurality of LSH groupings, a sequence of LSH segments that are each of a same size; and
the attention sub-layer is further configured to generate the attended input sequence that comprises a respective attended layer input at each of the plurality of input positions, including, for each LSH segment in the sequence of LSH segments, applying the attention mechanism over (i) respective queries within the LSH segment and (ii) respective queries within one or more preceding LSH segments.

19. The computer storage media of claim 17, wherein determining one or more respective hash values for each of the respective queries comprises repeatedly generating different hash values for the query using random projection techniques with different hash functions.

20. The computer storage media of claim 19, wherein repeatedly generating different hash values comprises generating the different hash values in parallel.

21. The computer storage media of claim 20, wherein assigning respective queries having similar hash values into the same LSH grouping comprises:
for each of the respective queries:
for each of the different hash values, assigning the query into a respective LSH grouping.

22. The computer storage media of claim 21, wherein assigning respective queries having similar hash values into the same LSH grouping further comprises:
for each of the respective queries:
computing a union of the respective LSH groupings to which the query has been assigned.

23. The computer storage media of claim 17, wherein each of the one or more LSH attention layers applies, for each LSH sub-layer, a respective query linear transformation to the input sequence to generate the sequence of queries for the LSH sub-layer.

24. A method comprising:
receiving a sequence of queries derived from an input sequence to a locality-sensitive hashing (LSH) attention layer of an attention neural network, the sequence of queries having a respective query at each of a plurality of input positions;
determining one or more respective hash values for each of the respective queries at each of the plurality of input positions;
generating a plurality of LSH groupings, including (i) assigning respective queries having similar hash values into a same LSH grouping and (ii) for each LSH grouping in the plurality of LSH groupings, sorting the respective queries in accordance with corresponding input positions for the queries in the LSH grouping; and
generating an attended input sequence that comprises a respective attended layer input at each of the plurality of input positions, including, for each LSH grouping in the plurality of LSH groupings, applying an attention mechanism over respective queries within the LSH grouping.

* * * * *